(12) United States Patent
Noailles et al.

(10) Patent No.: US 7,194,525 B1
(45) Date of Patent: Mar. 20, 2007

(54) METHOD FOR REMOTELY DOWNLOADING INFORMATION FOR PRINTING

(75) Inventors: Patrice Noailles, Paris (FR); Bernard Prost, Chaintre (FR)

(73) Assignee: Memopage Com., Paris (FR)

( * ) Notice: Subject to any disclaimer, the term of this patent is extended or adjusted under 35 U.S.C. 154(b) by 581 days.

(21) Appl. No.: 10/089,822

(22) PCT Filed: Oct. 3, 2000

(86) PCT No.: PCT/FR00/02735

§ 371 (c)(1),
(2), (4) Date: Apr. 4, 2002

(87) PCT Pub. No.: WO01/25983

PCT Pub. Date: Apr. 12, 2001

(30) Foreign Application Priority Data

Oct. 4, 1999 (FR) .................................. 99 12360
Feb. 22, 2000 (FR) .................................. 00 03624

(51) Int. Cl.
G06F 15/16 (2006.01)
G06F 15/00 (2006.01)
(52) U.S. Cl. ........................................ 709/219; 358/1.1
(58) Field of Classification Search ............... 709/201, 709/203, 219, 220, 223, 239; 358/1.1
See application file for complete search history.

(56) References Cited

U.S. PATENT DOCUMENTS

| | | | | |
|---|---|---|---|---|
| 5,247,575 A | * | 9/1993 | Sprague et al. ............... | 705/53 |
| 5,513,117 A | * | 4/1996 | Small .......................... | 700/233 |
| 5,684,956 A | * | 11/1997 | Billings ....................... | 709/219 |
| 5,748,484 A | * | 5/1998 | Cannon et al. .............. | 700/233 |
| 5,930,810 A | * | 7/1999 | Farros et al. ................ | 715/506 |
| 5,983,200 A | * | 11/1999 | Slotznick ..................... | 705/26 |
| 6,024,386 A | * | 2/2000 | Spector ....................... | 283/117 |
| 6,122,620 A | * | 9/2000 | Weber .......................... | 705/6 |
| 6,154,295 A | * | 11/2000 | Fredlund et al. ............ | 358/487 |
| 6,311,418 B1 | * | 11/2001 | Crowell ..................... | 40/124.08 |
| 6,535,294 B1 | * | 3/2003 | Arledge et al. ............. | 358/1.15 |
| 6,965,912 B2 | * | 11/2005 | Friedman et al. ........... | 709/203 |

(Continued)

OTHER PUBLICATIONS

"SmartUpdate Developers Guide"; Mar. 11, 1999; http://Developer.netscape.com/docs/manuals/jarman/index.htm.

(Continued)

Primary Examiner—David Wiley
Assistant Examiner—J. Bret Dennison
(74) Attorney, Agent, or Firm—RatnerPrestia

(57) ABSTRACT

The invention concerns a method for diffusing data contained in a computer database (2) in a form that can be easily transported and handled by a user (5). The method comprises steps which consist in: breaking down the data contained in the base (1) into units comprising each a predetermined number of signs; transmitting said units, in particular via a server (2) and a communication network (6), to a computer equipment (3) connected to a printer (3b); downloading into said equipment (3), in particular via said network (6), printing software means (2a) for printing with said printer (3b) a memo (7) in the form of a booklet of four pages. Thus the user (5) can access online said units, select those containing data of interest to him and command the printing thereof in the form of a booklet of four pages which can be easily carried.

12 Claims, 2 Drawing Sheets

U.S. PATENT DOCUMENTS

2002/0067500 A1*  6/2002  Yokomizo et al. ......... 358/1.15
2002/0194069 A1* 12/2002  Thakur et al. ................ 705/14

OTHER PUBLICATIONS

"PSUtils"; Jul. 30, 1999; http://www.dcs.ed.ac.uk/home/ajcd/psutils.

A. Demaille et al.; "GNU a 2ps, version 4.12, General Purpose Postscript Generating Utility"; Feb. 9, 1999.

"Adobe Acrobat Reader 3.0, Online Guide"; Oct. 8, 1996; http://shadow.uncg.edu/pvt/pdf-documents/reader.pdf.

\* cited by examiner

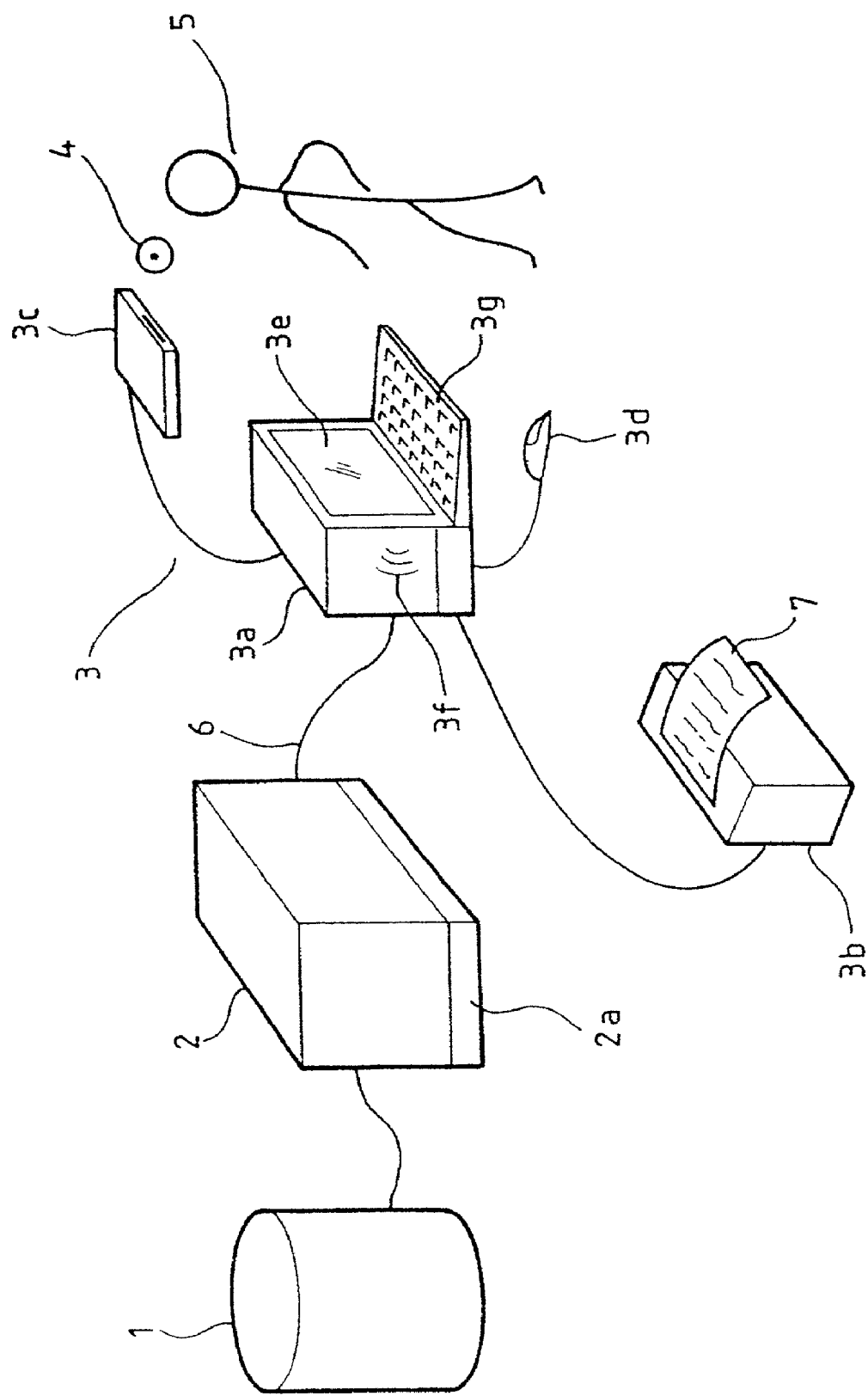
FIG_1

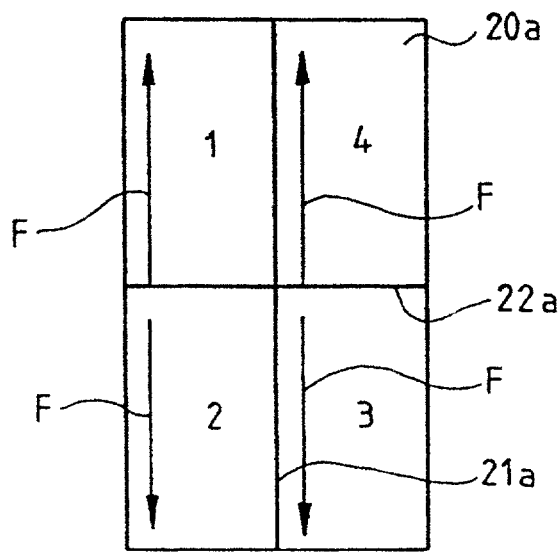
FIG_2a
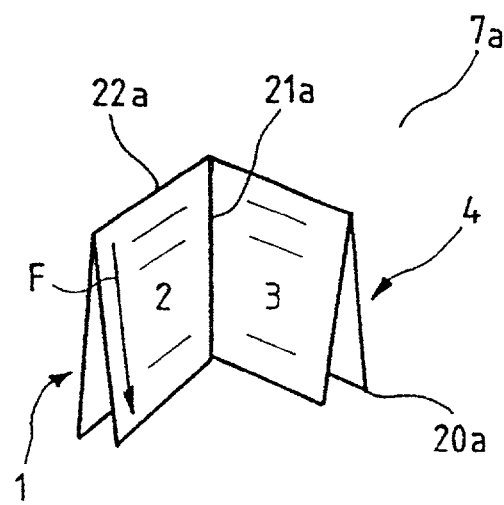
FIG_3a
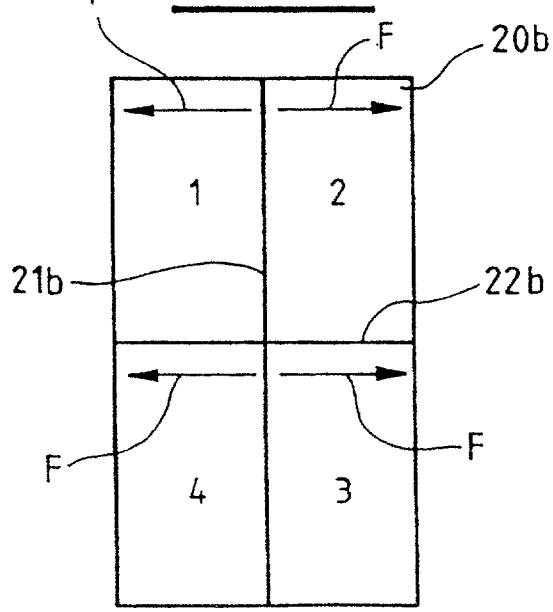
FIG_2b
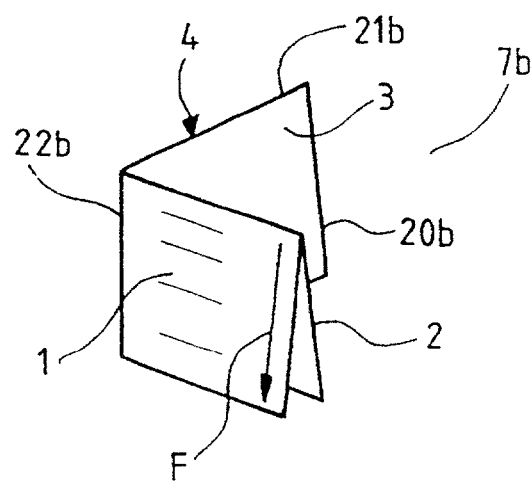
FIG_3b

METHOD FOR REMOTELY DOWNLOADING INFORMATION FOR PRINTING

FIELD OF INVENTION

This invention relates to a process for the distribution of information contained in a computer database in an easily transportable form that the user can handle and throw away.

BACKGROUND OF THE INVENTION

In general, database users view databases from computer equipment. This computer equipment is provided with a display screen on which users can read the data that they need.

However, database users would very frequently like to keep essential information in an easily transportable form.

There are printers than can be associated with computer equipment to obtain printouts of all or some of data displayed on display screens. These large paper printouts (A4 size) are not convenient to transport in clothes pockets. Obviously, it would be possible to fold them but in this case the information would no longer be quickly and easily accessible. The paper would have to be unfolded.

BRIEF SUMMARY OF THE INVENTION

The proposed solution solves this problem. The invention relates to a process for distributing information contained in a computer database in an easily transportable form that a user can handle.

The process according to the invention comprises several steps.

It comprises a step in which information contained in the database is broken down into units each comprising a predetermined number of symbols.

It also comprises a step in which units are sent to computer equipment connected to a printer, particularly through a server and a computer communication network and/or through a medium on which the information is saved, for example such as a compact disk. The user activates the computer equipment and the printer using control devices such as a keyboard and/or a mouse to activate optional menus.

Thus, the user can access units on line, select the units that contain the information in which he is interested, and control printing of these units on a printable medium using a printer, particularly one or several sheets of paper.

The process also comprises a step in which software printing means capable of printing a memo in the form of a four-page booklet can be loaded (particularly from a compact disk) or downloaded (particularly through the computer communication network).

Preferably, according to the invention, the software printing means implement a printing process comprising a step in which each unit is printed on the front of a sheet. The symbols contained in each unit are broken down into four frame numbers from 1 to 4 in the order of the pages of the booklet. The four frames are laid out on the front of the sheet of paper such that frames 1 to 3 are located on one of the diagonals of the rectangular sheet, and frames 2 and 4 are on the other diagonal. Frame numbers 2 and 3 are rotated by 180° from frame numbers 1 and 4.

Thus, after folding, the user has a four-page booklet.

According to a first variant embodiment of the invention, a memo can be printed in the landscape format starting from a rectangular sheet, and particularly an A4 sheet, by folding the printed sheet along a first fold line approximately along the mid-point and parallel to its longest side.

According to a second variant embodiment of the invention, a memo can be printed in the portrait format starting from a rectangular sheet, and particularly an A4 sheet, by folding the printed sheet along a first fold line approximately along the mid-point and parallel to its shortest side.

Regardless of which variant embodiment is used, the first fold fixes the outside pages 1 and 4 with the inside pages 2 and 3 after folding.

Preferably, according to the invention, the software printing means make use of a printing process also comprising a step in which advertising messages are printed in locations set aside for this purpose, particularly arranged vertically and/or in the margins of the frames and/or in frame No. 4.

The invention also relates to a system for distributing information contained in a computer database in an easily transportable form that a user who has this type of computer equipment can handle and throw away.

The system according to the invention is characterised in that the information is broken down into units each with a predetermined number of symbols.

The system is also characterised in that it comprises a server connected to the database and to the computer equipment through an Internet type computer communication network.

Thus, the user can access units on line and select the units that contain the information in which he is interested.

The system according to the invention also comprises a printer connected to the computer equipment. The user activates the computer equipment and the printer using control devices such as a keyboard and/or a mouse to activate optional menus.

Thus, the user can control printing of units on a printable medium using a printer, and particularly one or several sheets of paper.

Finally, the system according to the invention comprises software printout means that can be loaded (particularly from a compact disk) or downloaded (particularly through the computer communication network) into the computer equipment. The software printing means are capable of printing a memo in the form of a four-page booklet using the printer.

Preferably, according to the invention, the software printing means comprise means of printing each unit on the front of the sheet of paper. The symbols contained in each unit are broken down into four frame numbers from 1 to 4 in the order of the pages of the booklet. The four frames are placed on the front of the sheet of paper such that frames 1 and 3 are located on one of the diagonals and frames 2 and 4 are located on the other diagonal of the rectangular sheet. Frame numbers 2 and 3 are rotated by 180° from frame numbers 1 and 4.

Thus, after folding, the user has a four-page booklet.

According to a first variant embodiment of the invention, a memo can be printed in the landscape format starting from a rectangular sheet and particularly an A4 sheet, in which the printed sheet comprises a first fold line approximately at the mid-point of the sheet and parallel to its longest side.

According to a second variant embodiment of the invention, a memo can be printed in the portrait format starting from a rectangular sheet and particularly an A4 sheet, in which the printed sheet comprises a first fold line approximately at the mid-point of the sheet and parallel to its shortest side.

Thus, regardless of which variant embodiment is used, the first fold fixes the outside pages 1 and 4 with the inside pages 2 and 3.

Preferably, the software printing means comprise means of printing advertising messages in locations set aside for this purpose, particularly arranged vertically and/or in the margins of the frames and/or in frame number 4.

The invention also relates to a computer terminal connected to an Internet type computer communication network suitable to distribute information contained in a computer database in an easily transportable forms that a user who has this type of computer equipment can handle.

Information is broken down into units each comprising a predetermined number of symbols.

The information reaches the computer terminal from the database, through a server and through the computer communication network and/or through a medium on which the information is saved, for example such as a compact disk.

Thus, the user can access units on line and select the units containing the information in which he is interested.

The computer terminal is characterised in that is also comprises computer equipment, and also a printer connected to the computer equipment.

The user can activate the computer equipment and the printer using control devices such as a keyboard and/or a mouse to activate the optional menus.

Thus, the user can control printing of these units on a printable medium using a printer, particularly one or several sheets of paper.

The computer equipment also comprises software printing means that can be loaded (particularly from a compact disk) or downloaded (particularly through the computer communication network) into the computer equipment.

The software printing means are capable of printing a memo in the form of a four-page booklet, on a printer.

Preferably, the software means comprise means of printing each unit on the front of a sheet of paper. The symbols contained in each unit are broken down into four frame numbers from 1 to 4, in the order of the pages of the booklet. The four frames are placed on the front of the sheet of paper such that frames 1 and 3 are located on one of the diagonals of the rectangular sheet and frames 2 and 4 are located on the other diagonal. Frame numbers 2 and 3 are rotated by 180° from frame numbers 1 and 4.

Thus, after folding, the user has a four-page booklet.

According to a first variant embodiment of the invention, a memo can be printed in the landscape format starting from a rectangular sheet and particularly an A4 sheet, in which the printed sheet comprises a first fold line approximately at the mid-point of the sheet and parallel to its longest side.

According to a second variant embodiment of the invention, a memo can be printed in the portrait format starting from a rectangular sheet and particularly an A4 sheet, in which the printed sheet comprises a first fold line approximately at the mid-point of the sheet and parallel to its shortest side.

Thus, regardless of which variant embodiment is used, the first fold fixes the outside pages 1 and 4 with the inside pages 2 and 3.

Preferably, the software printing means comprise means of printing advertising messages in locations set aside for this purpose, particularly arranged vertically and/or in the margins of the frames and/or in frame number 4.

BRIEF DESCRIPTION OF THE DRAWINGS

Other characteristics and advantages of the invention will become clear after reading the description of variant embodiments of the invention given for information only, and in no way limitative, and:

FIG. 1 that shows a diagrammatic view of a general layout of a variant embodiment of the system according to the invention, FIG. 2*a* that shows a view of a sheet on which the elementary data is printed, before folding, FIG. 2*b* that shows a view of another variant embodiment of a sheet on which the elementary data is printed, before folding, FIG. 3*a* that shows a view of a four-page booklet in the portrait format, produced by folding the sheet shown in FIG. 2*a*, FIG. 3*b* that shows a view of a four-page booklet in the landscape format, produced by folding the sheet shown in FIG. 2*b*,

DETAILED DESCRIPTION OF THE INVENTION

The system comprises a computer server 2 associated with a database 1 containing information. This information is broken down into units each comprising a predetermined number of symbols. Thus, the manner in which this information is broken down is a means of defining the page layout of the units precisely to facilitate printing on a printable medium, and particularly on one or several sheets of paper or a plastified medium.

The system also comprises computer equipment 3. This computer equipment 3 comprises a microcomputer 3*a* comprising display means 3*e*, a keyboard 3*g*, a mouse 3*d* and listening means 3*f*. A printer 3*b* and means of reading a compact disk 3*c* are associated with the microcomputer 3*a*. The computer equipment 3 may also be in the form of a multimedia games console, particularly a Sega Dreamcast or Playstation 2 type console connected to a keyboard and a television screen.

The computer server 2 and the computer equipment 3 are interconnected through a computer communication network 6, particularly internet type equipment. The units contained in the database 1 are transmitted to the computer equipment 3 through the server 2 and the communication network 6. Thus, a user 5 can access units contained in the database 1 on line quickly and in an automated manner and can select the units containing the information in which he is interested.

Units can also be sent to the computer equipment 3 through a compact disk 4 that will be read using the drive 3*c* and can be viewed on the display screen 3*e*.

Printing a memo is a means of enabling the user to keep information about a unit with him on a printable medium, particularly one or several sheets of paper. The system achieves this in that it also includes means 2*a* of downloading through the server 2 and the computer network 6 to load software printing means into the said computer equipment 3. These software printing means may also be loaded into the computer equipment 3 using a compact disk 4 that will be read using the drive 3*c*.

We will now describe how these software printing means cooperate with the printer 3*b* associated with the computer equipment 3, to print a memo on a printable medium, and particularly a paper memo 7.

The software printing means contain the instructions necessary to divide the symbols contained in the unit to be printed, into four write frames (possibly the same size). These frames are referenced 1, 2, 3 and 4 in the logical order in which they are to be read. They are intended to be printed only on the front of the printable medium, and particularly the front of a sheet of paper 20a, 20b.

FIGS. 2a and 3a show the paper sheet 20b before and after folding, for a memo 7a in the portrait format.

Similarly, FIGS. 2a and 2b show the sheet of paper 20b before and after folding, for a memo 7b in the landscape format.

In the case of a memo 7a in the portrait format, the software means contain instructions for printing frames 1 to 4 as shown in FIG. 2a. Frames 2 and 4 are located on the same diagonal. Frames 1 and 3 are located on the other diagonal. Frames 1 and 4 are printed on the top part of the sheet 20a. Frames 2 and 3 are printed on the bottom part of the sheet 20a. The arrows F show the direction of the logical reading order in which each frame 1 to 4 must be printed. The arrows F are parallel to the longest side of the sheet 20a. On sheet 20a, the direction in which frames 1 and 4 are to be read is opposite to the direction in which frames 2 and 3 are to be read. Frames 1 and 4 are printed on one side of the median line 22a parallel to the shortest side of the sheet 20a, and frames 2 and 3 are printed on the other side. Frames 1 and 2 are printed on one side of the median line 22a parallel to the longest side of the sheet 21a, and frames 4 and 3 are printed on the other side. References 1 to 4 marked on sheet 20a show the location of the frames. A memo in the portrait format 7a (FIG. 3a) is obtained by folding sheet 20a, firstly along fold line 22a and secondly along fold line 21a. Thus, a memo with four pages in the portrait format 7a is obtained after folding.

In the case of a memo 7b in the landscape format, the software means contain instructions for printing frames 1 to 4 as shown in FIG. 2b. Frames 2 and 4 are located on the same diagonal. Frames 1 and 3 are located on the other diagonal. Frames 1 and 2 are printed on the top part of the sheet 20b. Frames 4 and 3 are printed on the bottom part of the sheet 20b. The arrows F show the direction of the logical reading order in which each frame 1 to 4 must be printed. The arrows F are parallel to the shortest side of the sheet 20b. On sheet 20b, the direction in which frames 1 and 4 are to be read is opposite to the direction in which frames 2 and 3 are to be read. Frames 1 and 2 are printed on one side of the median line 22a parallel to the shortest side of the sheet 20b, and frames 4 and 3 are printed on the other side. Frames 1 and 4 are printed on one side of the median line 22a parallel to the longest side of the sheet 21a, and frames 2 and 3 are printed on the other side. References 1 to 4 marked on sheet 20b show the location of the frames. A memo in the landscape format 7b (FIG. 3b) is obtained by folding sheet 20b, firstly along fold line 22b and secondly along fold line 22b. Thus, a memo with four pages in the landscape format 7b is obtained after folding.

In the case of a memo 7a in the portrait format, and also for a memo 7b in the "landscape" format, the fold lines are preferably indicated by marks and particularly dashed lines to facilitate folding. Also preferably, the sheets of the booklet after folding can be fixed together by depositing an adhesive substance at appropriate locations of the back of the sheet. Also to facilitate handling of the booklet, the sheet is folded along the first fold line, folding the lower part over the upper part. The result is a booklet in which the lower edges are fixed together. In this case, frames 1, 2, 3 and 4 should obviously be arranged such that they are read in the logical order of reading after folding.

The invention claimed is:

1. Process for distributing information contained in a computer database in an easily transportable form, the process comprising the steps of:

partitioning the information contained in the database into units of equal size each with a predetermined number of symbols that can be printed on a single sheet of paper in the form of a four-page booklet, on a server computer, transmitting the units from the server and through a computer communication network from a medium on which the information is saved, to client computer equipment, separate from the server computer, the client computer equipment being connected to a printer;

activating the client computer equipment and the printer via a sequence of menus to access the units on line from the server computer, to select the units containing the information in which the user is interested, and to control printing of these units on a printable medium using the printer, the process further comprising a step of loading, or downloading a software printing process which includes the steps of formatting each unit of the retrieved information on a single sheet of paper in the form of a four-page booklet and controlling the printer to print the information in the form of the four-page booklet, wherein the software printing process includes the steps of:

breaking down the symbols contained in each unit into four frames ordinally numbered first to fourth following an order of the pages of the booklet, and laying out the four frames on a front side of the sheet of paper such that the first and third frames are located on one diagonal of the sheet, and the second and fourth frames are located on an other diagonal of the sheet.

2. Process according to claim 1, further including the steps of:

folding the sheet by rotating the second and third frames by 180° from the first and fourth frames, whereby the user will have a four-page booklet after folding.

3. Process according to claim 2, wherein:

the sheet is a rectangular sheet and, if the booklet is in landscape format, the folding step includes the step of folding the printed sheet along a first fold line approximately in a median line parallel to a longer side of the sheet, if the booklet is in portrait format, the folding step includes the step of folding the printed sheet along a first fold line approximately in a median line parallel to a shorter side of the sheet, whereby after the folding step, the first fold fixes the first and fourth pages as outside pages and the second and third pages as inside pages.

4. Process according to any one of claims 1 to 3, such that the software printing process also comprises a step of printing advertising messages in predetermined locations the predetermined locations being arranged at least one of vertically, in the margins of the frames, or in the fourth frame.

5. A system for distributing information contained in a computer database in an easily transportable form comprising:

means for dividing the information into units each unit having a predetermined number of symbols that can be printed on a single sheet of paper in the form of a four-page booklet;

client computer equipment coupled to a global information network and accessible to the user;

a server, separate from the client computer equipment and connected through the global information network to the database and the computer equipment such that the user can access the units on line and select those units containing information in which the user is interested, a printer connected to the client computer equipment;

wherein the client computer equipment includes at least one control device that is employed by the user to activate the computer equipment and the printer and to activate optional menus, whereby the user controls printing of the units on a printable medium;

software printout means configured to be loaded or downloaded into the computer equipment;

the software printout means being configured to break down the symbols contained in each unit into four frames ordinally numbered first to fourth following an order of the pages of the booklet, to lay out the four frames on a front side of the sheet of paper such that the first and third frames are located on one diagonal of the sheet, and the second and fourth frames are located on an other diagonal of the sheet and to print each unit of the information selected by the user as a memo in the form of a four-page booklet on a single sheet of paper, using the printer.

6. System according to claim 5, wherein the printable medium is a rectangular sheet and the system further includes:

means for folding the rectangular sheet by rotating the second and third frames by 180° from the first and fourth frames, whereby the user has a four-page booklet after folding.

7. System according to claim 6, further comprising:

if the memo is in landscape format means for printing a first fold line approximately along a median line of the rectangular sheet parallel to a longest side of the rectangular sheet, if the memo is in portrait format means for printing a first fold line approximately along a median line parallel to a shortest side of the rectangular sheet, such that, after folding, the first and fourth pages are fixed as outside pages and the second and third pages are fixed as inside pages.

8. System according to any one of the previous claims 5 or 7, wherein the software printing means further comprise means for printing advertising messages in predetermined locations selected from a group consisting of vertically, in margins of the frames, or in the fourth frame.

9. Client computer terminal connected to a global communication network suitable to distribute information contained in a computer database in a form that a user having access to such a client computer terminal can easily transport and handle, wherein:

the information is partitioned into units each containing a single predetermined number of symbols that can be printed on a single sheet of paper in the form of a four-page booklet;

the information is provided to the computer terminal from the database through a server, separate from the client computer terminal, and the global information network or through a tangible information medium, the client computer terminal comprising:

means configured to provide the user with access to the units and to allow the user to select the units that contain the information in which the user is interested, a client computer, a printer connected to the client computer;

control devices activating the client computer using the menus displayed by the client computer, software printing means configured to be loaded on the client computer from a CD_ROM or downloaded to the client computer from a global communications network, the software printing means being configured to break down the symbols contained in each unit into four frames ordinally numbered first to fourth following an order of the pages of the booklet, to lay out the four frames on a front side of the sheet of paper such that the first and third frames are located on one diagonal of the sheet, and the second and fourth frames are located on an other diagonal of the sheet and to control the printer to print the selected units of information as respective four-page booklets on respective rectangular sheets of paper.

10. Client computer terminal according to claim 9, further including:

means for folding the rectangular sheet by rotating the second and third frames by 180° from the first and fourth frames, whereby when the folding is complete, the user has a four-page booklet.

11. Client computer terminal according to claim 10, wherein the software printout means comprises if the booklets are in landscape format, means for printing the rectangular sheet to include a first fold line approximately along a median line parallel to a longest side of the rectangular sheet, if the booklets are in portrait format, means for printing a first fold line approximately along a median line parallel to a shortest side of the rectangular sheet, whereby after folding by the folding means, the first fold fixes the first and fourth pages as outside pages and pages 2 and 3 as inside pages.

12. Client computer terminal according to any one of claims 9 to 11 wherein the software printout means comprise means of printing advertising messages in predetermined locations selected from a group consisting of: vertically, in margins of the frames or in the fourth frame.

* * * * *